United States Patent [19]

Furutani et al.

[11] Patent Number: 5,020,444
[45] Date of Patent: Jun. 4, 1991

[54] METHOD OF AND APPARATUS FOR CONTROLLING MAGNETIC LEVITATION

[75] Inventors: Akihiro Furutani; Junichi Okada; Tomoaki Tanimoto, all of Kitakyushu, Japan

[73] Assignee: Kabushiki Kaisha Yasakawa Denki Seisakusho, Kitakyushu, Japan

[21] Appl. No.: 517,745

[22] Filed: May 2, 1990

[30] Foreign Application Priority Data

May 9, 1989 [JP] Japan .................................. 1-114095

[51] Int. Cl.[5] ............................................. B60L 13/06
[52] U.S. Cl. ..................................... 104/284; 104/283
[58] Field of Search ............... 104/281, 282, 284, 290, 104/291, 293; 105/149; 318/135, 648, 687, 649, 638, 646; 361/144

[56] References Cited

U.S. PATENT DOCUMENTS

| | | | |
|---|---|---|---|
| 3,736,880 | 6/1973 | Ross | 104/293 |
| 3,871,301 | 3/1975 | Kolm et al. | 104/293 |
| 4,838,172 | 6/1989 | Morishita et al. | 104/284 |
| 4,868,708 | 9/1989 | Bohn | 104/284 |
| 4,924,778 | 5/1990 | Morishita et al. | 104/284 |

Primary Examiner—Robert J. Oberleitner
Assistant Examiner—Mark T. Le
Attorney, Agent, or Firm—Oblon, Spivak, McClelland, Maier & Neustadt

[57] ABSTRACT

The present invention relates to an improvement in a method and an apparatus for magnetic levitation of a linear slider through a PI control action. When the slider is horizontally moved while levitated vertically by two fixed magnetic forces, the angle of inclination of the slider cannot be settled in a preset position because of a control delay caused by integral action, which results in an angle offset. In order to eliminate the offset, a signal which is the sum of an angle deviation and a delay compensation signal that is proportional to the product of the velocity of the slider and an integral time is used as an error signal to settle the angle of inclination. The vertical position of the slider is controlled so that the sum of the magnetic forces applied to the slider balances the weight of the slider.

6 Claims, 6 Drawing Sheets

METHOD OF AND APPARATUS FOR CONTROLLING MAGNETIC LEVITATION

FIELD OF THE INVENTION

The present invention relates to a method and an apparatus for levitating an object magnetically by controlling an electric current supplied to an electromagnet.

BACKGROUND OF THE INVENTION

There have been two methods for controlling magnetic levitation to move an object linearly in a horizontal plane:

(a) An electromagnet is mounted on a slider to levitate it magnetically above a ferromagnetic rail to move it horizontally along the rail. While the method provides a relatively easy way of controlling magnetic levitation because the point of action of a magnetic force on the slider is fixed constant with respect to the center of gravity of the slider, the method is disadvantageous in that the slider has to be moved pulling lead wires.

(b) A plurality of electromagnets are fixed and a ferromagnetic slider is levitated by magnetic fields produced by the electromagnets. This method allows the slider to be moved without pulling lead wires. However, since the position of the point of action of a magnetic force with respect to the center of gravity varies as the slider moves, magnetic levitation control is relatively difficult.

Figure 7:
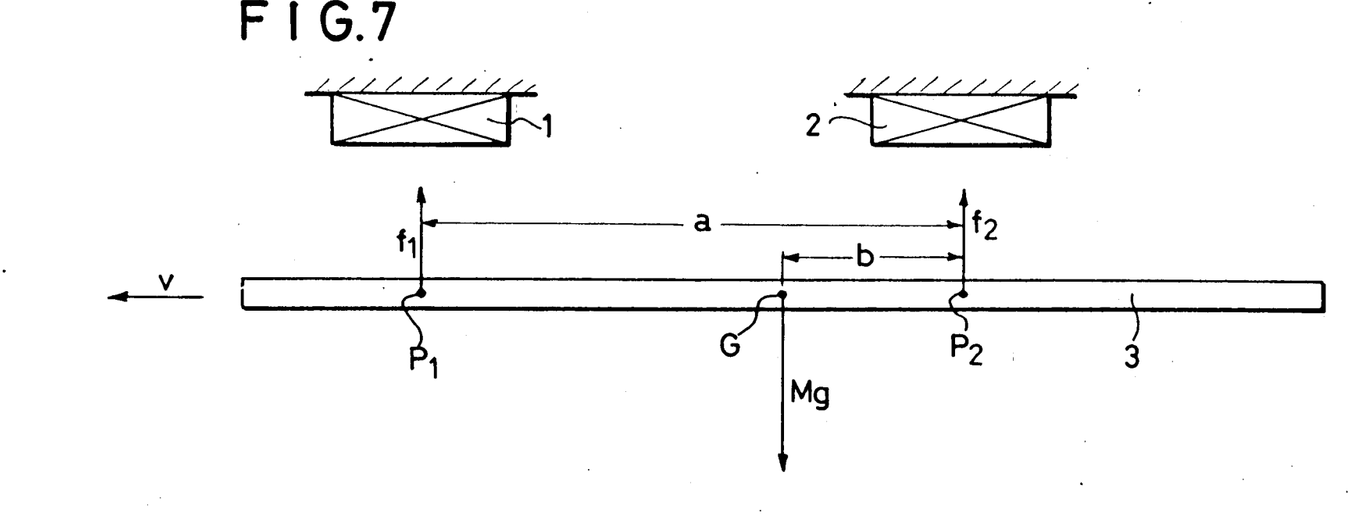
FIG. 7 shows a schematic diagram of a conventional horizontal linear slider device for levitating a slider with magnetic fields generated by a plurality of fixed electromagnets.

FIG. 7 shows a schematic diagram of a conventional horizontal linear slider device adapted to said method (b).

Axes of electromagnets 1, 2 are directed substantially vertically. Slider 3 is magnetically levitated vertically and moved horizontally in the first and second magnetic fields generated by the electromagnets 1, 2, respectively. Hereinafter, the vertical direction is referred to as the x direction, the horizontal direction in which the slider 3 moves as the y direction, and the direction perpendicular to both x and y directions as the z direction.

It is assumed that the first and second magnetic fields apply first and second magnetic forces $f_1$, $f_2$, respectively, to slider 3 at points of action, $P_1$, $P_2$, which are horizontally spaced apart by a distance a, that the center of gravity G of the slider 3 and the point of action $P_2$ are horizontally spaced apart by a distance b, and that the gravity acting on the slider 3 is Mg. Then, the motion of the slider 3 can be divided into two components, i.e., the motion of the center of gravity caused by an external force $F = f_1 + f_2 Mg$ and the rotational motion caused by a torque $N = f_1(a-b) - f_2 b$ about a rotational axis passing through the center of gravity and parallel to the z direction (hereinafter referred to as a "C.G. axis"). Thus, the process of controlling the magnetic levitation of the linear slider can be carried out by a center of gravity levitation control (hereinafter referred to as "C.G. levitation control") step to retain the center of gravity G at a given x position and by an inclination control step of controlling an angle of inclination $\theta$ of the slider 3 about the C.G. axis to hold the slider at a horizontal position ($\theta = 0$).

Figure 8:
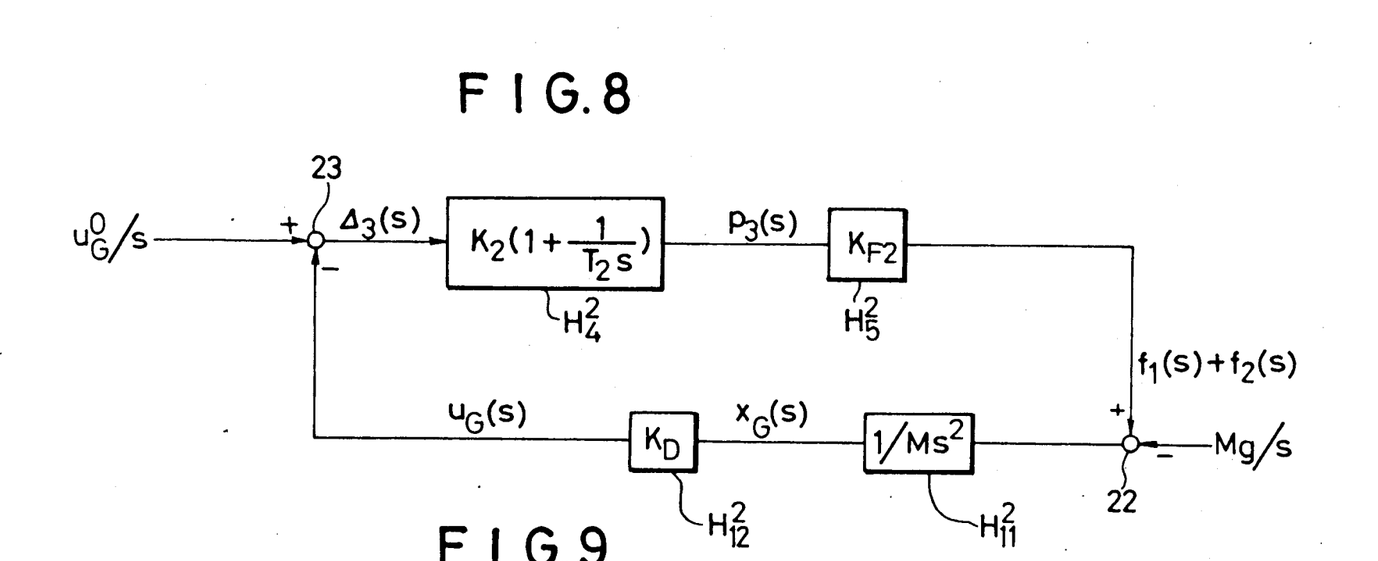
FIGS. 8 and 9 are block diagrams explaining the fundamental concepts of the C.G. levitation control step and the inclination control step, respectively.
Figure 9:
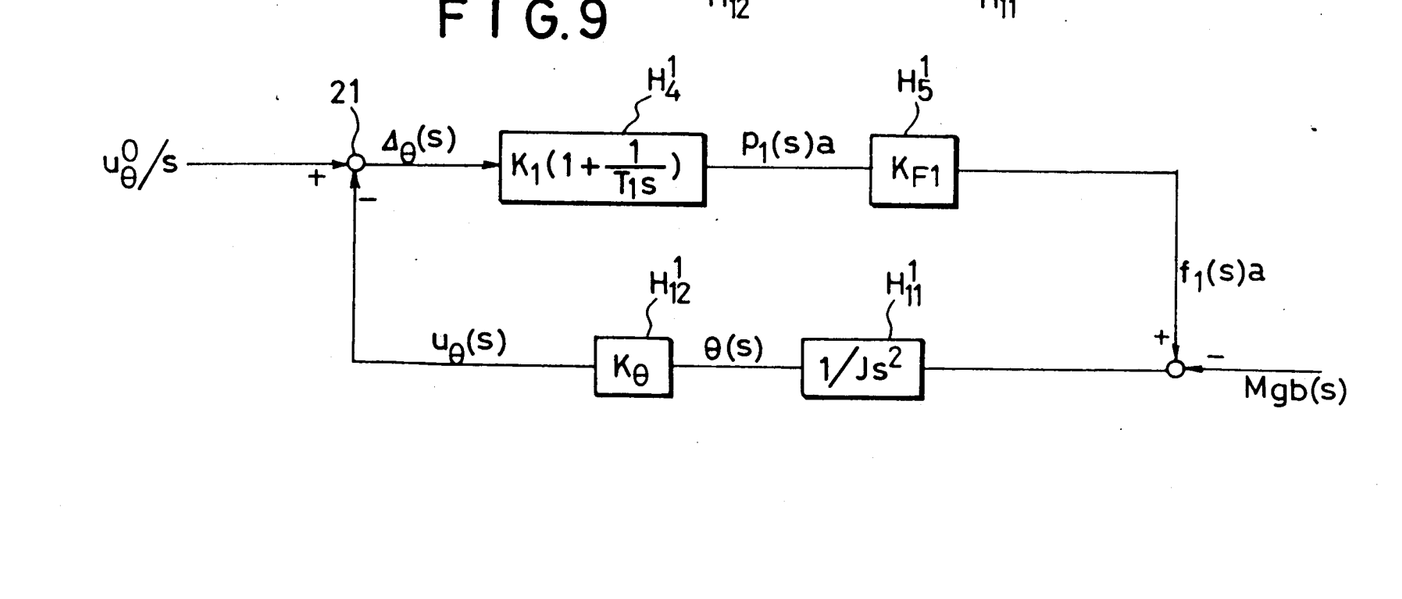

FIGS. 8 and 9 represent Laplace-transformed block diagrams to explain the fundamental concepts of said C.G. levitation control step and said inclination control step, respectively.

In the step shown in FIG. 8, the weight Mg/s of slider 3 is input as a disturbance into the control loop, and a magnetic force command $p_3(s)$ is generated so that total magnetic force $f_1(s) + f_2(s)$ balances the gravity Mg/s. A transfer function $H_4{}^2 = K_2\{1 + (T_2 s)^{-1}\}$ is that of a proportional integral (PI) controller. Said magnetic force command $p_3(s)$ generates a magnetic force $f_1(s) + f_2(s)$ according to a transfer function $H_5{}^2 = K_{F2}$. A transfer function $H_{12}{}^2 = K_D$ is the transfer function of an $x_G$ detector, and generates an x-position detection signal $u_G(s)$ from the x-position (x coordinate) of the center of gravity $x_G(s)$. The x-position detection signal $u_G(s)$ is compared with a preset value $u_G{}^0/S$ to generate a deviation signal $\Delta_3(s)$. These transfer functions constitute a closed control loop. The PI control unit outputs the magnetic force command $p_3(s)$ so as to compensate for the deviation signal $\Delta_3(s)$. As can be calculated easily, a final value of the deviation signal $$\Delta_{3L} = \lim_{s \to 0} s\Delta_3(s)$$

becomes 0, and the x-position of the center of gravity $x_G$ is controlled so that it is settled at the preset value $u_G{}^0$.

In the step shown in FIG. 9, it is assumed that said external force F exerted on slider 3 is substantially in balance ($= 0$). Then, said torque N approximates $f_{1a} - Mgb$, i.e., the vector sum of torque caused by magnetic force $f_1$ and gravity around an axis through point of action $P_2$ parallel to the z direction (hereinafter, referred to as the $P_2$ axis). Thus, control of inclination angle $\theta$ can be carried out so as to balance the torque $f_{1a}$ with the torque Mgb. The torque Mgb(s) is input into the control loop as a disturbance. The resultant torque $N = f_1(s)a - Mgb(s)$ generates an angle of inclination $\theta(s)$ according to a transfer function $H_{11}{}^1 = 1/(Js^2)$ (where J is the moment of inertia of the slider about the C.G. axis), and then generates an angle signal $u_\theta(s)$ corresponding to the angle of inclination $\theta(s)$ according to transfer function $H_{12}{}^1 = K_\theta$. The difference $\Delta_\theta(s)$ between the angle signal $u\theta(s)$ and a preset angle value $u\theta^0(s)$ ($= u\theta^0/s$) corresponding to the horizontal plane is input as an error signal to the PI controller (transfer function $H_4{}^1$), which then generates a torque command $p_1(s)a$ (or a magnetic force command $p_1(s)$). The torque command $p_1(s)a$ generates a torque about the $P_2$ axis, $f_1(s)a = K_{F1}p_1(s)a$ according to the transfer function $H_5{}^1 = K_{F1}$.

Said transfer function $H_{12}{}^1$ is the transfer function of the angle detector which detects the angle of an inclination of the slider 3. The transfer functions $H_4{}^1$, $H_5{}^1$ correspond respectively to the transfer functions $H_4{}^2$, $H_5{}^2$ shown in FIG. 8.

If said slider 3 moves at a constant velocity v in the y direction, then $b = r + vt$, and hence $b(s) = (r/s) + (v/s^2)$. As a result, the angle deviation signal $\Delta_\theta(s)$ is expressed by the following equation, and its final value $\Delta_{\theta L}$ does not become 0:

$$\Delta_\theta(s) = \frac{\frac{u_G{}^0}{s} + Mg\left(\frac{r}{s} + \frac{v}{s^2}\right) H_{11}^1 H_{12}^1}{1 + H_4^1 H_5^1 H_{11}^1 H_{12}^1} \tag{1}$$

$$\Delta_{\theta L} = \lim_{s \to 0} s\Delta_\theta(s) \qquad (2)$$
$$= \frac{MgvT_1}{K_1 K_{F1}} \neq 0$$

As described above, since the final value of the deviation does not vanish in the inclination control step shown in FIG. 9, slider 3 is settled in an inclined state (in an angular offset state) and the offset depends on the velocity v of said slider 3, and in order to compensate for such an offset, it is necessary to control the inclination of the slider so that any deviation in the x-position of the center of gravity $x_G$ is not caused by the inclination control.

SUMMARY OF THE INVENTION

It is an object of the present invention to provide a method and an apparatus for controlling the inclination of the slider, which are capable of compensating for said angular offset.

Another object of the present invention is to provide a method and an apparatus for controlling C.G. levitation capable of compensating for a deviation in the x-position of the center of gravity caused by the inclination control.

The above objects can be achieved by a method and an apparatus for controlling the inclination as recited in claims 1 and 4, and by a method and an apparatus for controlling C.G. levitation as recited in claims 2 and 5 or 3 and 6.

In the conventional inclination control step, the offset $\Delta_{\theta L}$ expressed by equation (2) is caused by the following reasons: When a torque $f_{1a}$ produced by a magnetic force $f_1$ is controlled so as to balance with a torque $Mg(r+vt)$ produced by gravity acting on the moving slider 3 in the step shown in FIG. 9, a delay in control, corresponding to an integral time $T_1$ due to the integral action of the PI controller, takes place, and hence the torque $f_{1a}$ to balance the torque caused by the gravity becomes $Mg\{r+v(t-T_1)\}$ at the time t. As a consequence, a deviation corresponding to the difference between this torque and the disturbance $Mg(r+vt)$ is produced. The offset $\Delta_{\theta L}$ can be removed by inputting a delay compensation signal $MgvT_1/(K_1 K_{F1})$ in advance together with the angle deviation signal.

Figure 4:
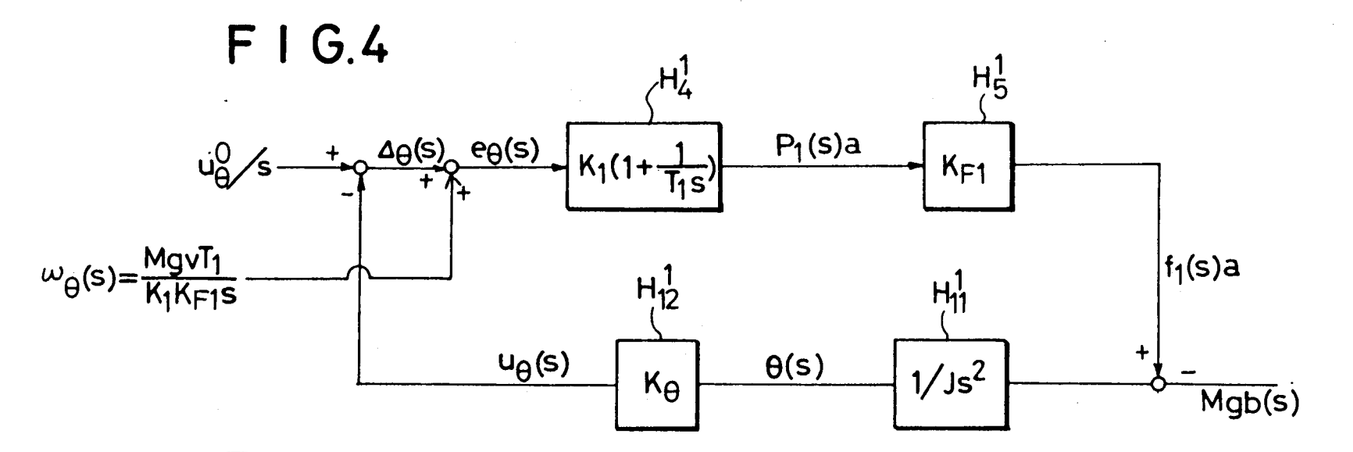
FIG. 4 is a block diagram representing the principle of the inclination control step according to the present invention.

The principle of the inclination control step according to the present invention is illustrated in the block diagram in FIG. 4.

An angle error signal $e_\theta$ is the sum of an angle deviation signal $\Delta_\theta = \theta^0 - u_{74}$ and a delay compensation signal $\omega_\theta = MgvT_1/K_1 K_{F1}$. The other elements shown in the block diagram are the same as those illustrated in FIG. 9.

Thus, $$\Delta_\theta(s) = \frac{\frac{u_G^0}{s} + Mg\left(\frac{r}{s} + \frac{v}{s^2}\right) H_{11}^1 H_{12}^1}{1 + H_4^1 H_5^1 H_{11}^1 H_{12}^1} - \frac{H_4^1 H_5^1 H_{11}^1 H_{12}^1}{1 + H_4^1 H_5^1 H_{11}^1 H_{12}^1} \omega_\theta(s) \qquad (3)$$

Since the first term in the right in equation (3) is identical with equation (1), the final value thereof is equal to equation (2). On the other hand, since $$\lim_{s \to 0} s \cdot \frac{H_4^1 H_5^1 H_{11}^1 H_{12}^1}{1 + H_4^1 H_5^1 H_{11}^1 H_{12}^1} \omega_\theta(s) = \frac{MgvT_1}{K_1 K_F}, \qquad (4)$$

we have $$\Delta_{\theta L} = \lim_{s \to 0} s\Delta_\theta(s) = 0 \qquad (5)$$

Thus, the slider 3 can be held horizontally irrespective of its velocity.

Figure 5:
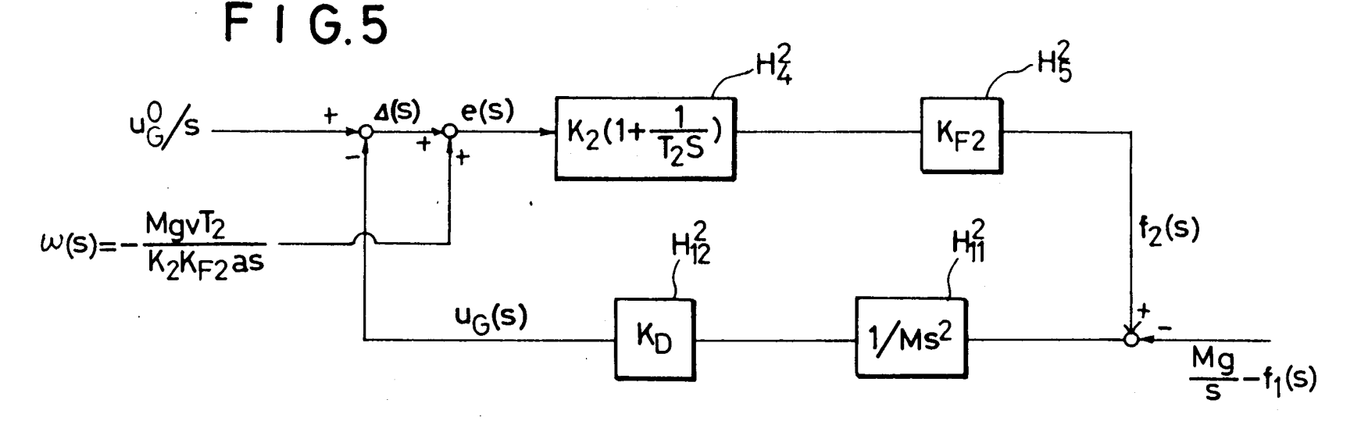
FIGS. 5 and 6 are block diagrams representing the principle of the C.G. levitation control steps according to the present invention.

The principle of the C.G. levitation control step according to the present invention is shown in the block diagram in FIG. 5. FIG. 5 shows the step of controlling C.G. levitation controlled by a second magnetic force $f_2(s)$ while the angle of inclination is controlled by a magnetic force $f_1(s)$ in FIG. 4. Therefore, the first magnetic force $f_1(s)$ is a disturbance in this step.

If the inclination of the slider 3 is nearly balanced, then the first magnetic force $f_1(s)$ can be approximated by $Mgb(s)/a$ (see FIG. 4). An error signal $e(s)$ is the sum of a deviation signal $\Delta(s) = u_G^0(s) - u_G(s)$ and a delay compensation signal $w(s) = -MgvT_2/(K_2 K_{F2} as)$. The other elements shown in FIG. 5 are identical to those shown in FIG. 8. Therefore, the deviation signal $\Delta(s)$ is given by the following equation:

$$\Delta(s) = \frac{\frac{u_G^0}{s} + \frac{Mg}{s} H_{11}^2 H_{12}^2}{1 + H_4^2 H_5^2 H_{11}^2 H_{12}^2} - \frac{\omega(s) H_4^2 H_5^2 + f_1(s)}{1 + H_4^2 H_5^2 H_{11}^2 H_{12}^2} H_{11}^2 H_{12}^2 \qquad (6)$$

Since $$f_1(s) = \frac{Mgb(s)}{a} = \frac{Mg\left(\frac{r}{s} + \frac{v}{s^2}\right)}{a} \qquad (7)$$

and $$\lim_{s \to 0} \{\omega(s) H_4^2 H_5^2 + f_1(s)\} = 0, \qquad (8)$$

we have $$\Delta_L = \lim_{s \to 0} s \cdot \Delta(s) = 0 \qquad (9)$$

The center of gravity is now controlled so that it reaches a preset x-position.

Figure 6:
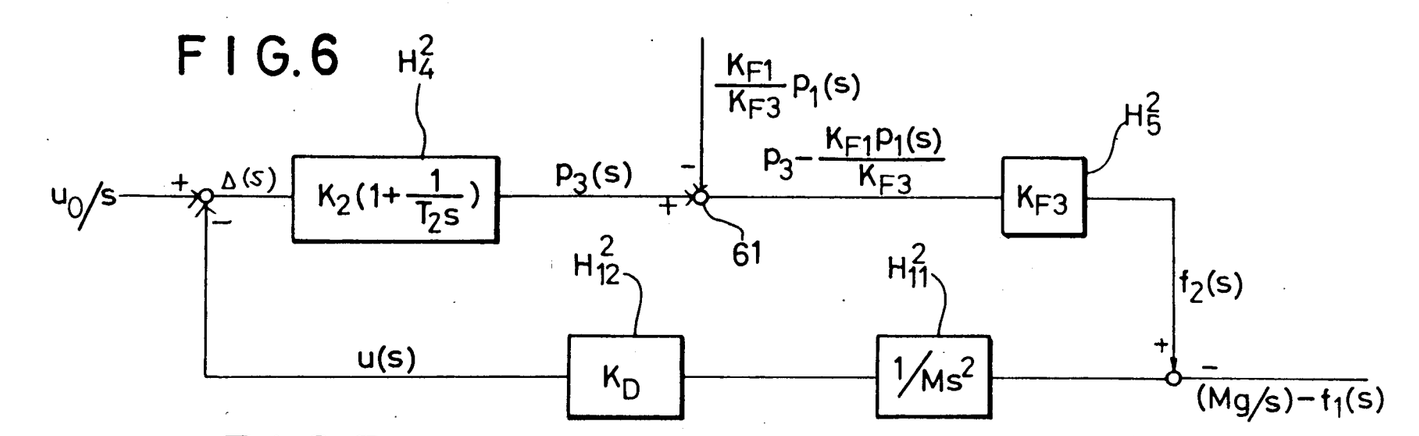

The principle of the alternative step of controlling C.G. levitation according to the present invention is shown by the block diagram in FIG. 6.

As described above with reference to FIG. 8, as long as the sum of the first and second magnetic forces $f_1 + f_2$ is controlled, the final value $\Delta_L$ of the deviation in the x-position of the center of gravity $x_G$ becomes 0, even if delay compensation is not carried out. Delay compensation is required in the C.G. levitation control step shown in FIG. 5 because the first and second magnetic forces $f_1$, $f_2$ are controlled independently of each other. However, according to the C.G. levitation control step shown in FIG. 6, no delay compensation is required because the sum of the first and second magnetic forces $f_{1+f2}$ is controlled.

A subtractor 61 produces an output $p_3(s) - \{K_{F1}p_1(s)/F_{F3}\}$ (where $p_1(s)$ is the magnetic force command and $K_{F1}$ is the transfer function $H_5^1$ shown in FIG. 4), which generates a magnetic force $f_2 = K_{F3}p_3(s) - f_1(s)$ according to the transfer function $H_5^2$. Therefore, we have $p_3 = (f_1+f_2)/K_{F3}$, and accordingly the magnetic force command $p_3$ controls the sum of the magnetic forces $f_1+f_2$.

A deviation signal $\Delta(s)$ and its final value $\Delta_L$ in the step shown in FIG. 6 are expressed by the following equations:

$$\Delta(s) = \quad (10)$$

$$\frac{\frac{u_G^0}{s} + \frac{K_{F1}}{K_{F3}} p_1(s)H_5^2 H_{11}^2 H_{12}^2 + \left(\frac{Mg}{s} - f_1(s)\right) H_{11}^2 H_{12}^2}{1 + H_4^2 H_5^2 H_{11}^2 H_{12}^2}$$

Taking into account $$\frac{K_{F1}}{K_{F3}} p_1 H_5^2 = f_1(s), \quad (10a)$$

$$\Delta_L = \lim_{s \to 0} s \cdot \Delta(s) = \lim_{s \to 0} \frac{u_G^0 + MgH_{11}^2 H_{12}^2}{1 + H_4^2 H_5^2 H_{11}^2 H_{12}^2} = 0 \quad (11)$$

Accordingly, the center of gravity is controlled so that it reaches a preset x-position.

Embodiments of the present invention will herein after be described with reference to FIGS. 1-3.

PREFERRED EMBODIMENTS OF THE INVENTION

Figure 1:
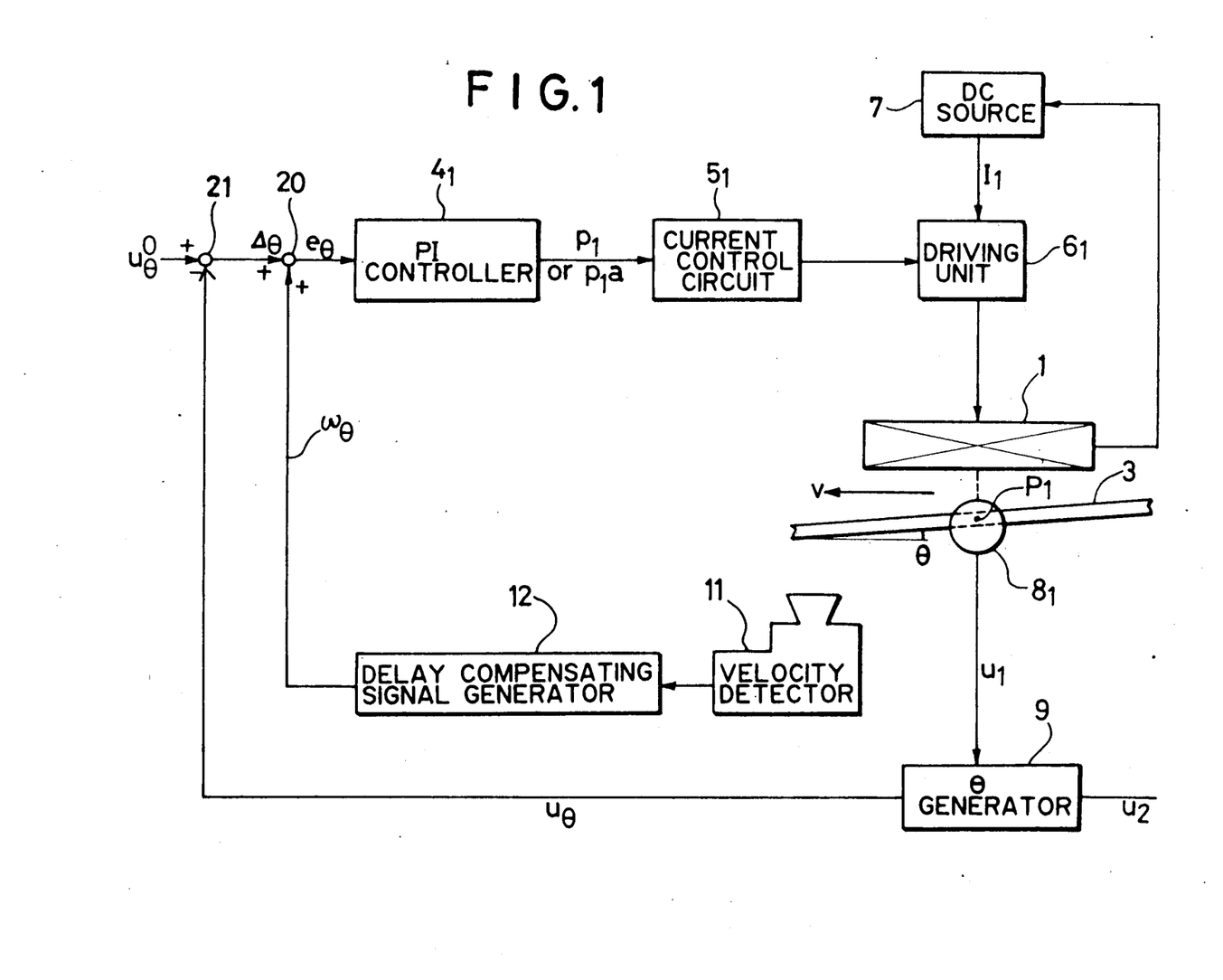
FIG. 1 is a block diagram of a preferred embodiment of an apparatus for controlling the inclination of a slider according to the present invention.

FIG. 1 is a block diagram of an embodiment of an apparatus for controlling the inclination of the slider 3 according to the present invention.

The inclination control apparatus controls a first magnetic force $f_1$ to control the inclination.

An $x_1$-detector $8_1$ detects a vertical position $x_1$ of said slider 3 at a point of action P1 of the first magnetic force, and outputs a position detection signal $u_1$. A $\theta$-generator 9 generates an angle detection signal $u_\theta$ corresponding to $\theta = \tan^{-1}(x_{2-x1})a$ in response to the position detection signal $u_1$ and a position detection signal $u_2$ corresponding to a vertical position $x_2$ of the point (not shown) of action P2 of a second magnetic force. A subtractor 21 receives a preset angle value signal $U_\theta^0$ (which corresponds to a horizontal position $\theta = 0$ in this embodiment) and the angle detection signal $u_\theta$ to generate an angle deviation signal $\Delta_\theta = u_\theta^0 - u_\theta$.

A velocity detector 11 detects a velocity v of slider 3 in a horizontal direction (y direction), and generates a velocity signal. A delay compensation signal generator 12 outputs a delay compensation signal $\omega_\theta(=MgvT_1/K_1K_{F1})$ in response to said velocity signal. An adder 20 generates an angle error signal $e_\theta(=\Delta_\theta+\omega_\theta)$ in response to the angle deviation signal $\Delta_\theta$ and the delay compensation signal $\omega_\theta$. PI controller 4$_1$ effects a PI control action of a proportional gain $K_1$ and an integral time $T_1$ in response to the angle error signal $e_\theta$, and outputs a control signal (magnetic force command) $p_1$ corresponding to the angle error signal $e_\theta$. The magnetic force command $p_1$ generates a torque about the P2 axis, whose magnitude is proportional to $p_{1a}$. Therefore, the output signal from the PI controller 4$_1$ may be considered as a torque command whose magnitude is $p_{1a}$.

A current control circuit 5$_1$ controls driving unit 6$_1$ to generate a magnetic force (first magnetic force) in proportion to the magnetic force command $p_1$. An electromagnet 1 is energized by a current $I_1$ supplied from DC source 7 through driving unit 6$_1$. Thus, electromagnet 1 generates a magnetic force $f_1$ of $K_{F1}P_1$ in strength, and the magnetic force $f_1$ generates a torque $K_{F1}p_{1a}$. Therefore, the product of the transfer functions of current control circuit 5$_1$, driving unit 6$_1$, and electromagnet 1 is the transfer function $H_5^1$ shown in FIG. 4. The torque $K_{F1}p_{1a}$ is controlled in a direction to reduce the inclination of slider 3.

In operation, it is assumed that an electromagnet 2 is positioned to the right of the electromagnet 1 and that slider 3 moves horizontally to the left at a constant velocity v. If the horizontal distance between the point of action P2 and the center of gravity of the slider 3 is given by $b = r+vt$ (see FIG. 7), then slider 3 is subjected to a torque N expressed by the following equation:

$$N = af_1 - Mg(r+vt) \quad (12)$$

When slider 3 is inclined by the torque N, $\theta$-generator 9 generates and outputs an angle detection signal $u_\theta$ corresponding to $\theta$. Velocity detector 11 detects the velocity v of slider 3 and outputs a velocity detection signal, whereby delay compensation signal generator 12 generates and outputs a delay compensation signal $\omega_\theta = MgvT_1/(K_1K_{F1})$. Adder 20 generates an angle error signal $e_\theta = \Delta\theta + w_\theta$, and feeds angle error signal $e_\theta = \Delta\theta + \omega_\theta$ to PI controller 4$_1$. PI controller 4$_1$ then generates and outputs a PI control signal (magnetic force command) $p_1$ to compensate for the angle error signal $e_\theta$. The current control circuit 5$_1$, responsive to the magnetic force command $p_1$, controls driving unit 6$_1$ which supplies current $I_1$ so that the strength of the first magnetic force $f_1$ becomes $K_{F1}p_1$. The first magnetic force $f_1$ generates a torque $K_{F1}p_{1a}$. Therefore, the angle of inclination of the slider 3 is controlled by the torque $K_{F1}p_{1a}$ so that the angle error signal $e_\theta$ is 0. Since an integral action of PI control causes a delay in control by integral time $T_1$, the angle deviation signal $\Delta_\theta$ after the time $T_1$ is controlled by the present angle error signal $e_\theta$ so that $\Delta_\theta$ is 0. In this manner, the final value of the angle deviation signal becomes 0 (see equation (5)).

Figure 2:
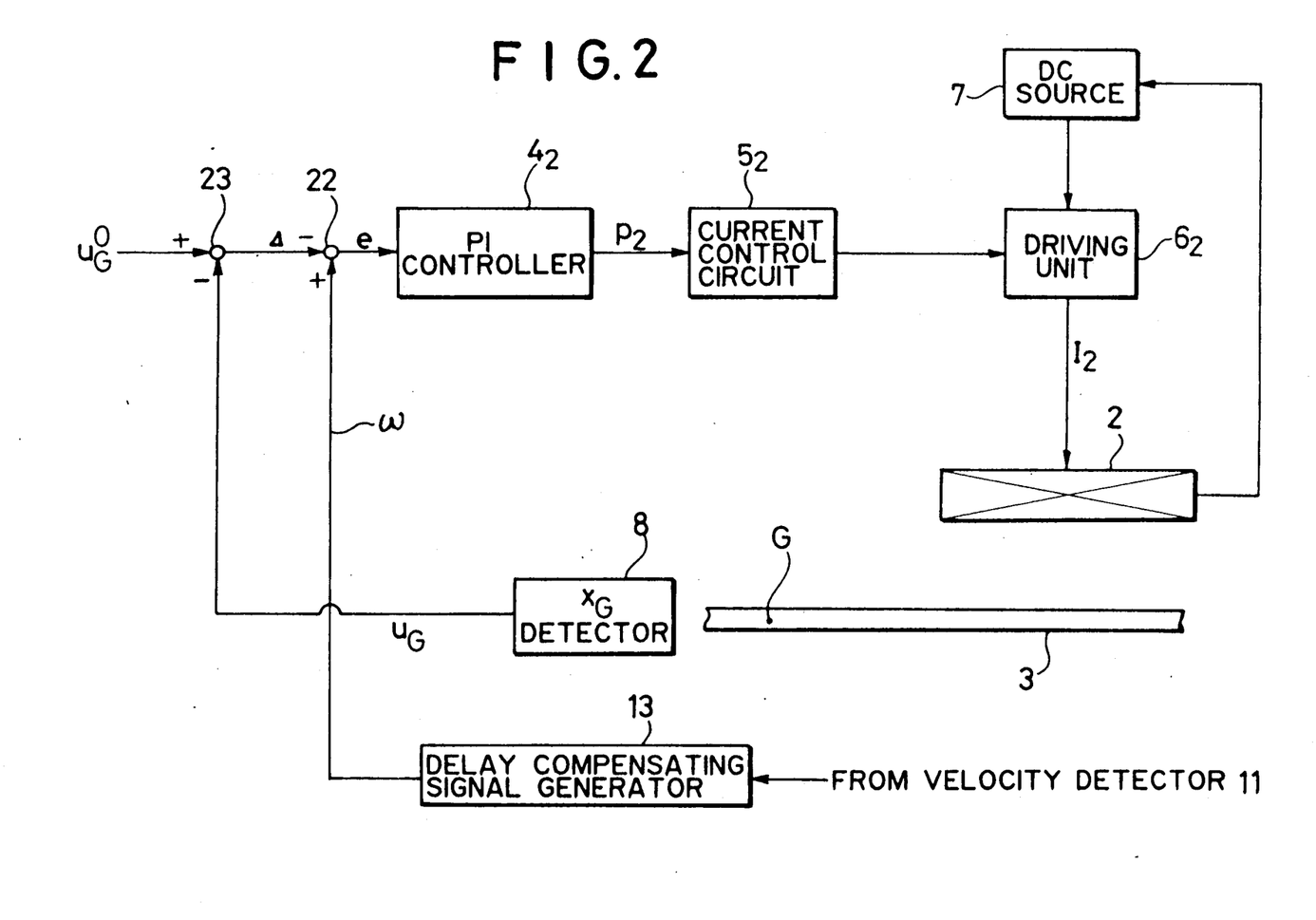
FIGS. 2 and 3 are block diagrams of first and second embodiments of an apparatus for controlling C.G. levitation according to the present invention.

FIG. 2 is a block diagram of a first embodiment of an apparatus for controlling C.G. levitation according to the present invention.

The C.G. levitation control apparatus controls a second magnetic force $f_2$ to control the x-position of the center of gravity $x_G$ of slider 3.

For this control, the first magnetic force $f_1$ is approximated to the value $Mgb/a$ as described above, and the second magnetic force $f_2$ is controlled so that the following equation is satisfied:

$$f_1 + f_2 - Mg = 0 \tag{13}$$

In light of the block diagram (see FIG. 5), the Laplace transform $f_2(s)$ corresponding to the second magnetic force $f_2$ is controlled so as to balance with a disturbance $(Mg/s)-(Mgb(s)/a)$ corresponding to $Mg-f_1$. In order to compensate for a control delay caused by PI control action, a velocity signal generated by the velocity detector 11 is transmitted to a delay compensation signal generator 13 which generates a delay compensation signal $\omega$ $(-MgvT_2/(K_2K_{F2}a))$. The delay compensation signal $\omega$ is added to a deviation signal $\Delta$, and the sum is supplied to PI controller $4_2$. In this manner, the position of the center of gravity can be controlled so that it is settled at a preset x-position (see equation (9)).

Figure 3:
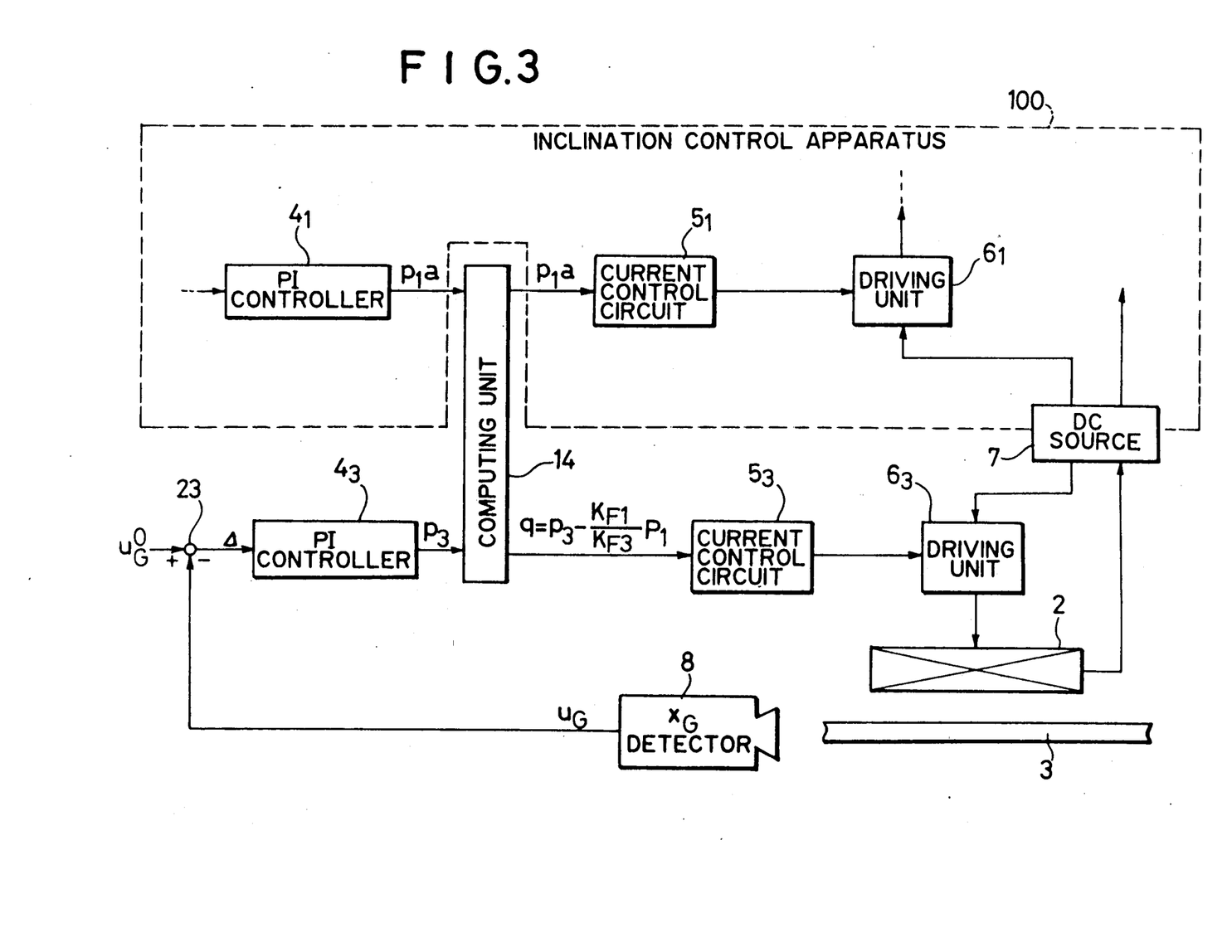

FIG. 3 is a block diagram of a second embodiment of an apparatus for controlling C.G. levitation.

The C.G. levitation controlling apparatus according to this embodiment differs from the C.G. levitation controlling apparatus according to the first embodiment in that the x-position of the center of gravity $x_G$ is detected by an $xG$ detector for controlling total magnetic force $(f_1+f_2)$. In this case, as described with reference to FIG. 8, the final value of the deviation in the x-position of the center of gravity becomes 0, and no delay compensation is required.

The C.G. levitation controlling apparatus according to the present embodiment has an computing unit 14 which generates a magnetic force command $q = p_3 - (K_{F1}p_1/K_{F3})$ for commanding a second magnetic force $f_2$ in response to a magnetic force command $p_3$ output by PI controller $4_3$ and a magnetic force command $p_1$ of an inclination controlling apparatus 100. The inclination controlling apparatus 100 is the same as that shown in FIG. 1. $K_{F1}$ and $K_{F3}$ are transfer functions which generate the first magnetic force $f_1$ from the magnetic force commands $p_1$ of the inclination controlling apparatus 100, and the second magnetic force $f_2$ from the magnetic force command $q$, respectively. Therefore, $$f_2 = K_{F3}q = K_{F3}p_3 - f_1 \tag{18}$$

Hence, $$p_3 = \frac{f_1 + f_2}{K_{F3}} \tag{19}$$

Accordingly, the magnetic force command $p_3$ corresponds to total magnetic force $(f_1+f_2)$. As a result, when $p_3$ is controlled so that total magnetic force $K_{F3}p_3$ is equalized to $Mg$, the center of gravity $G$ is held stationary at the preset height.

If the C.G. levitation controlling apparatus shown in FIG. 2 and the inclination controlling apparatus 100 are combined, or if the C.G. levitation controlling apparatus according to the present embodiment and the inclination controlling apparatus 100 are combined, then it is possible to move the slider 3 in a horizontal direction keeping the slider 3 horizontally at a given height.

As described above, the present invention realizes the following advantages:

1. The inclination of the slider is controlled by a PI control process using, as an error signal, the sum of the angle deviation signal and the delay compensation signal for the inclination of the slider, so that a control delay due to the integral action of the PI control process can be compensated for. Consequently, the angle of inclination can be controlled without any offset.

2. The x-position of the center of gravity of the slider is controlled by a PI control process using, as an error signal, the sum of the C.G. position deviation signal and the delay compensation signal for the position of the center of gravity, so that a control delay due to the integral action of the PI control process can be compensated for. As a result, the C.G. levitation control can be effected without any offset.

3. It is feasible to settle a magnetic levitation of the center of gravity of a slider without any offset without compensating for a delay caused by an integral action of PI control by controlling the total magnetic forces to be balanced by gravity.

What is claimed is:

1. A method for controlling magnetic levitation in a linear slider device wherein first and second magnetic fields directed substantially vertically are generated, and a slider having a weight $Mg$ is levitated by first and second magnetic forces, said first and second magnetic fields acting on said slider, respectively, and is moved with the center of gravity of the slider positioned between points of action of the first and second magnetic forces on the slider, so that the slider is magnetically levitated horizontally at a prescribed height and moved horizontally at a constant velocity $v$, said method comprising:

a center of gravity levitation control step to levitate the center of gravity of the slider magnetically; and an inclination control step of compensating for an angle deviation which is the angle of inclination of the slider with respect to a horizontal plane about a horizontal axis passing through said center of gravity and perpendicular to the direction in which the slider moves;

said inclination control step further comprising the steps of:

generating a first PI control signal $p_1$ for effecting a proportional integral control action of a proportional gain $K_1$ and an integral time $T_1$ in response to an angle error signal;

causing a first magnetic force proportional to said first PI control signal $p_1$ with a proportional constant $K_{F1}$ to act on the slider;

controlling the angle of inclination of the slider by a torque about said horizontal axis caused by said first magnetic force;

generating an angle deviation signal corresponding to said angle of inclination; and combining said angle deviation signal and a first delay compensation signal having a magnitude of $MgvT_1/(K_1K_{F1})$, thereby generating said angle error signal.

2. A method according to claim 1, wherein said center of gravity levitation control step comprises the steps of:
generating a second PI control signal $p_2$ for effecting a proportional integral control action of a proportional gain $K_2$ and an integral time $T_2$ in response to an error signal;
generating the second magnetic force proportional to said second PI control signal $p_2$ with a proportional constant $K_{F2}$;
controlling a vertical position of the center of gravity of the slider by the second magnetic force;
generating a deviation signal corresponding to the difference between the vertical position of the center of gravity and a preset position; and
combining said deviation signal and a second delay compensation signal having a magnitude of $-MgvT_2/(aK_2K_{F2})$ where a is the horizontal distance between the points of action of the first and second magnetic forces on the slider, thereby generating said error signal.

3. A method according to claim 1, wherein said center of gravity levitation control step comprises the steps of:
generating a third PI control signal $p_3$ for effecting a proportional integral control action of a proportional gain $K_3$ and an integral time $T_3$ in response to an error signal;
calculating $p_3 - (K_{F1}p_1)/K_{F3}$ from said first PI control signal $p_1$ and said third PI control signal $p_3$ where $K_{F3}$ is a constant;
generating a second magnetic force proportional to $p_3 - (K_{F1}p_1)/K_{F3}$ with the constant $K_{F3}$ being used as a proportional constant; and
generating said error signal corresponding to the difference between the vertical position of the center of gravity and a preset position.

4. An apparatus for controlling magnetic levitation in a linear slider device wherein first and second magnetic fields directed substantially vertically are generated, and a slider having a weight Mg is levitated by first and second magnetic forces, said first and second magnetic fields acting on said slider at first and second points of action, respectively, and moved horizontally at a constant velocity v with the center of gravity of the slider positioned between said first and second points of action, said apparatus comprising:
a center of gravity levitation controlling apparatus for levitating the center of gravity of the slider magnetically; and
an inclination controlling apparatus for compensating for an angle deviation which is the angle of inclination of the slider with respect to a horizontal plane about a horizontal axis passing through said center of gravity of the slider and perpendicular to the direction in which the slider moves;
said inclination controlling apparatus including a first PI controller for generating a first PI control signal $p_1$ for effecting a proportional integral control action of a proportional gain $K_1$ and an integral time $T_1$ in response to an angle error signal; first magnetic field generating means for generating a first magnetic force having a strength $K_{F1}p_1$ proportional to the first PI control signal $p_1$; and means for comparing, with a preset angle, an angle of inclination of the slider about a horizontal axis passing through said center of gravity and perpendicular to the direction in which the slider moves, thereby generating an angle deviation signal; characterized in that said inclination controlling apparatus further comprises:
a velocity detector for detecting the velocity of the slider;
a first delay compensation signal generator for calculating $MgvT_1/(K_1K_{F1})$ from said velocity detected by said velocity detector and outputting the calculated value as a first delay compensation signal; and
first adding means for adding said angle deviation signal and said first delay compensation signal, and generating said angle error signal.

5. An apparatus according to claim 4, wherein said center of gravity deviation controlling apparatus includes a second PI controller for generating a second PI control signal $p_2$ for effecting a proportional integral control action of a proportional gain $K_2$ and an integral time $T_2$ in response to an error signal; second magnetic field generating means for generating said second magnetic force having a strength of $K_{F2}p_2$ proportional to said second control signal $p_2$; and means for generating a deviation signal corresponding to a difference between a vertical position of said center of gravity of the slider and a preset position; said center of gravity levitation controlling apparatus further comprising:
a velocity detector for detecting a velocity v of said slider;
a second delay compensation signal generator for calculating $-MgvT_2/(aK_2K_{F2})$ wherein a is the distance between the first and second points of action, and outputting the calculated value as a second delay compensation signal; and
second adding means for adding said deviation signal and said second delay compensation signal, and generating said error signal.

6. An apparatus according to claim 4, wherein said center of gravity levitation controlling apparatus comprises:
a third PI controller for generating a third PI control signal $p_3$ for effecting a proportional integral control action in response to an error signal;
calculating means for calculating $p_3 - (K_{F1}p_1)/K_{F3}$ from the first PI control signal $p_1$ and the third PI control signal $p_3$ wherein $K_{F3}$ is a constant;
third magnetic field generating means for generating said second magnetic force having a strength proportional to $p_3(K_{F1}p_1)/K_{F3}$ with the constant $K_{F3}$ being used as a proportional constant; and
means for generating the error signal corresponding to the difference between the vertical position of the center of gravity and a preset position.

* * * * *